United States Patent
Huang et al.

(10) Patent No.: US 7,408,601 B1
(45) Date of Patent: Aug. 5, 2008

(54) ELECTRONICALLY TUNABLE POLARIZATION-INDEPENDENT MICRO LENS USING POLYMER NETWORK TWISTED NEMATIC LIQUID CRYSTAL

(75) Inventors: Yuhua Huang, Orlando, FL (US);
Hongwen Ren, Orlando, FL (US);
Xinyu Zhu, Orlando, FL (US);
Shin-Tson Wu, Oviedo, FL (US)

(73) Assignee: Research Foundation of the University of Central Florida, Inc., Orlando, FL (US)

( * ) Notice: Subject to any disclaimer, the term of this patent is extended or adjusted under 35 U.S.C. 154(b) by 0 days.

(21) Appl. No.: 11/298,118

(22) Filed: Dec. 9, 2005

Related U.S. Application Data

(62) Division of application No. 10/871,109, filed on Jun. 18, 2004, now Pat. No. 7,079,203.

(60) Provisional application No. 60/480,707, filed on Jun. 23, 2003.

(51) Int. Cl.
*G02F 1/1333* (2006.01)

(52) U.S. Cl. ............... 349/95; 349/86; 349/88; 349/92; 349/93; 349/94; 349/200

(58) Field of Classification Search ............ 349/200
See application file for complete search history.

(56) References Cited

U.S. PATENT DOCUMENTS

| | | | |
|---|---|---|---|
| 4,572,616 A | 2/1986 | Kowel | 350/355 |
| 5,071,229 A | 12/1991 | Oaki et al. | 359/53 |
| 5,150,234 A | 9/1992 | Takahashi et al. | 359/65 |
| 5,499,127 A | 3/1996 | Tsubota et al. | 359/80 |
| 5,627,665 A * | 5/1997 | Yamada et al. | 349/156 |
| 5,699,133 A | 12/1997 | Furuta | 349/13 |
| 5,919,606 A | 7/1999 | Kazlas et al. | 430/321 |
| 6,219,113 B1 * | 4/2001 | Takahara | 349/42 |

(Continued)

OTHER PUBLICATIONS

"Phase-only modulation with twisted nematic liquid-crystal spatial light modulators," N. Konforti, et.al., *Optic Letters*, vol. 13, No. 3, Mar. 1988, pp. 251-253.

(Continued)

*Primary Examiner*—David C. Nelms
*Assistant Examiner*—Lucy P Chien
(74) *Attorney, Agent, or Firm*—Brian S. Steinberger; Phyllis K. Wood; Law Offices of Brian S. Steinberger, P.A.

(57) ABSTRACT

Inhomogeneous concentrated polymer network with approximately 90° twisted nematic liquid crystal (TN-LC) is used for fabricating lens and prisms. For forming a positive lens, the approximately 90° TN-LC polymer network concentration can gradually decrease from the center to the side edges. For forming a negative lens, the approximately 90° TN-LC polymer network concentration can gradually increase from the center to the side edges. The lens can be created by ultra violet (UV) light exposure to patterned photo masks. The lens can be tuned by applying voltage above the threshold voltage to the polymer network. The inhomogeneous 90° TN-LC polymer network can also be used in Fresnel lens and prisms. Applications of the invention can be used for micro lens, array, optical communication, microoptics, adaptive optics and beam steering.

1 Claim, 17 Drawing Sheets

U.S. PATENT DOCUMENTS

| | | | | |
|---|---|---|---|---|
| 6,355,315 | B1* | 3/2002 | Kubota et al. | 428/1.1 |
| 6,864,951 | B1* | 3/2005 | Ren et al. | 349/200 |
| 2002/0097355 | A1 | 7/2002 | Kralik et al. | 349/86 |
| 2002/0181126 | A1 | 12/2002 | Nishioka | 359/726 |
| 2005/0179855 | A1* | 8/2005 | Helgee et al. | 349/172 |

OTHER PUBLICATIONS

"Electrically tunable and polarization insensitive Fabry-Perot etalon with a liquid-crystal film," J. S. Patel et. al., *Applied Physics Letters*, vol. 58 No. 22.

"Polarization insensitive tunable liquid-crystal etalon filter", J. S. Patel, et al, *Applied Physics*, Lett. 59, Sep. 1991, pp. 1314-1316.

Cylindrical Liquid crystal lens and its applications in optical pattern correlation systems: H.E. Zhan, et al. *Jpn. J. Appl. Phys.* vol. 34 (1995) pp. 2392-2395.

"Transient Properties of a liquid-crystal microlens" Mao Me, et al, *Jpn J. Appl. Phys.* vol. 40 (2001) pp. 6012-6016.

"Inhomogeneous nanoscale polymer-dispersed liquid crystals with gradient refractive index", Hongwen Ren, et al, Applied Physics Letters, vol. 81, No. 19, Nov. 4, 2002, pp. 3537-3539.

"Simulations of liquid-crystal Fabry-Perot etalons by an improved 4×4 matrix method," Yuhua Huang, et. al., *Journal of Applied Physics*, vol. 93, No. 5, Mar. 1, 2003, pp. 2490-2495.

\* cited by examiner

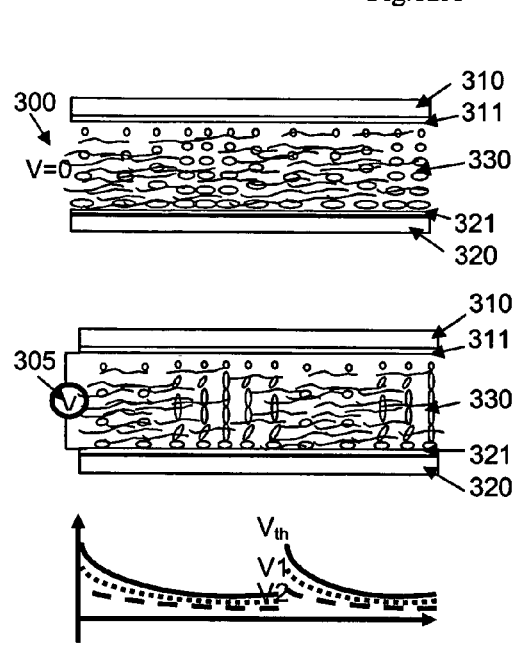
Fig.12A
Fig.12B
Fig.13
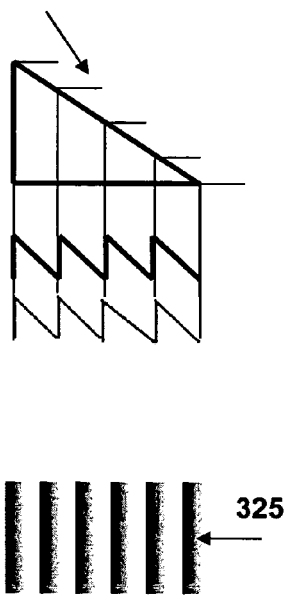
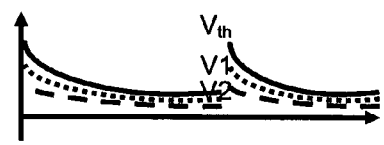
Fig.14

0  Fig.15
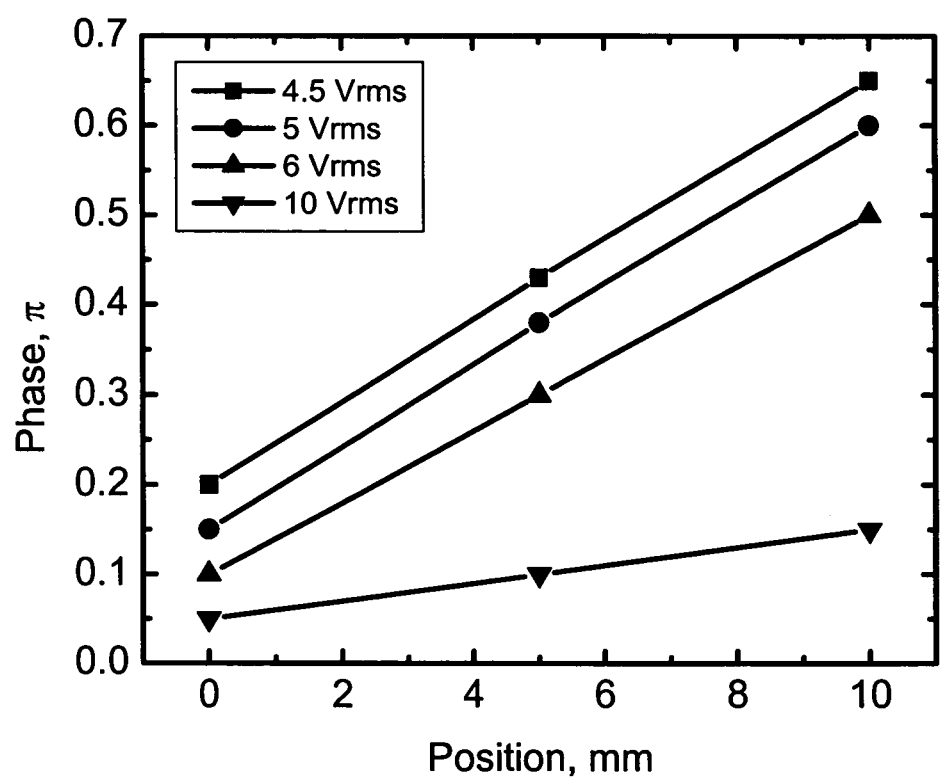
Fig.16

Positive Fresnel lens photomask

Negative Fresnel lens photomask

700

730

900

ELECTRONICALLY TUNABLE POLARIZATION-INDEPENDENT MICRO LENS USING POLYMER NETWORK TWISTED NEMATIC LIQUID CRYSTAL

This is a Divisional of application Ser. No. 10/871,109 filed Jun. 18, 2004 now U.S. Pat. No. 7,079,203 which claims priority of U.S. Provisional Application 60/480,707 filed Jun. 23, 2003.

FIELD OF THE INVENTION

This invention relates to electrically tunable lens, and in particular to the polarization independent lens with the use of an approximately 90° twisted nematic liquid crystal (TN-LC) polymer network and method of forming and fabricating tunable lens.

BACKGROUND AND PRIOR ART

Micro lenses have attracted extensive attention because it is one of the most important components in the microoptics field for optical fiber coupling, optical parallel processing, optical interconnection, adaptive optics, beam steering and optical biomedicine. Many kinds of methods and materials have been proposed to fabricate micro lens.

Liquid crystal (LC) devices have been widely used in a variety of applications including display, shutter, mirror, and grating. For example, Tsubota et al. in U.S. Pat. No. 5,499,127 describes a LC device with a display area and U.S. Pat. No. 5,699,133 to Furuta describes the use of twisted nematic liquid crystal (TNLC) as a shutter. Another use of liquid crystals as cells is disclosed in U.S. Pat. No. 5,919,606 to Kazlas et al. A polymer dispersed liquid crystal (PDLC) device with a polymer concentration of more than 65% is disclosed in U.S. Pat. Publication No. US2002/0097355 A1 to Kralik et al. In addition, liquid crystal (LC) devices have also been proposed for application as electrically tunable micro lens due to the ability of controlling the phase of light passing through them; see for example, U.S. Pat. No. 4,572,616 to Kowel, U.S. Pat. No. 5,071,229 to Oaki et al., U.S. Pat. No. 5,150,234 to Takahashi et al. and U.S. Pat. Publication No. 2002/0181125 A1 to Nishioka. Cylindrical and circular LC lenses with variable focal length have been produced using slit-patterned and circular-hole-patterned electrode structures, respectively. Two papers have been published: 1. "Cylindrical liquid crystal lens and its applications in optical pattern correlation systems", published by He et al in the *Japanese Journal of Applied Physics*, Vol. 34, No. 5A, May 1995, pp. 2392-2395, and 2. "Transient properties of a liquid crystal micro lens", published by Ye and Sato in the *Japanese Journal of Applied Physics*, Vol. 40, No. 11, November 2001, pp. 6514-6521. However, there are some problems with the liquid crystal devices. The major disadvantage is that these devices are sensitive to the polarization of the incident light. Therefore, a linearly polarized light is usually required to avoid the polarization dispersion. In addition to the loss of at least half of the incident light, the requirement of linearly polarized light is also an obstruction to applying liquid crystal lens in the micro-optics field, especially for fiber-optic communication, because the polarization of the light passing through a fiber is unpreserved.

To overcome the polarization problem, J. S. Patel published a paper "Polarization insensitive tunable liquid crystal etalon filter" in *Applied Physics Letters*, Vol. 59, No. 11, September 1991, pp. 1314-1316 reporting on a double crossed-layer liquid crystal device. However, the fabrication process is complicated and the light must be split into two beams passing through the cell simultaneously. In 2002, H. W. Ren and S. T. Wu published a paper on the gradient refractive index nanoscale polymer-dispersed liquid crystal (GRIN PDLC; *Applied Physics Letters*, Vol. 81, 3537-9 (2002)). Due to the nanoscale LC droplets involved, the GRIN PDLC lens is independent of light polarization. However, the nanoscale PDLC droplets are difficult to be reoriented by the electric field so that the required voltage is quite high (~100V). In 1991, J. S. Patel et al published a paper "Electrically tunable and polarization insensitive Fabry-Perot etalon with a liquid-crystal film" in *Applied Physics Letters*, Vol. 58, pp. 2491-2493 (1991). The authors observed the polarization-independent phenomenon in a Fabry-Perot cavity with a 90° twisted nematic (TN) LC. However, this paper did not teach how to make a tunable electronic lens. To make such a lens, a gradient refractive index has to be formed.

In this invention, we develop methods for achieving a gradient refractive index profile in a polymer-network approximately 90° TN-LC cell for tunable electronic lens. Such an electronic lens is independent of light polarization and has a relatively low (<20V) operating voltage.

SUMMARY OF THE INVENTION

A primary objective of the invention is to provide a gradient-index liquid crystal lens with a tunable focal length.

A secondary objective of the invention is to provide tunable electronic micro lenses and prisms with the use of polymer network approximately 90° TN-LC.

A third objective of the invention is to provide tunable electronic micro lens arrays and prisms using a polymer network approximately 90° TN-LC cell and a biased voltage. Such a lens or prism is independent of the polarization state of the incident light.

A fourth objective of the invention is to provide tunable electronic micro lens arrays and prisms with the use of polymer network approximately 90° TN-LC, which operate at low voltage.

A fifth objective is to provide tunable electronic micro lens arrays and prisms using a polymer network approximately 90° TN-LC, which can be used as a positive lens.

A sixth objective is to provide tunable electronic micro lens arrays and prisms with the use of polymer network approximately 90° TN-LC, which can be used as a negative lens.

The invention devices include "gradient-index electronic micro lens" using inhomogeneous polymer network approximately 90° TN-LC. An applied voltage can shape the refractive index profile of the inhomogeneous medium. This electronic lens can be a broadband device, which is suitable for white light operation. The device remains clear in the voltage-on and -off states. The applied voltage can tune the effective focal length. Owing to the bias voltage effect, the response time can be as fast as ~1 ms, depending on the cell gap. The invention can be used as a positive lens or a negative lens. Additional applications include a Fresnel lens and an array of lens. Further applications allow for the invention to be used in optical communication, optical biomedicine and in fiber-optic couplers. The micro lens arrays can be applied to optical parallel processing, adaptive optics and laser beam steering.

Further objects and advantages of this invention will be apparent from the following detailed description of a presently preferred embodiment, which is illustrated, schematically in the accompanying drawings.

DESCRIPTION OF THE FIGURES

FIG. 12A shows a side view of a prism device using inhomogeneous polymer network of 90° twisted nematic liquid crystal without voltage.

FIG. 12B shows another view of the prism device of FIG. 12A with voltage more than the polarization independent threshold voltage Vt.

FIG. 13 shows a voltage plot of the prism device of FIGS. 12A-12B.

FIG. 14 shows a photo mask for fabricating inhomogeneous liquid crystal polymer network for the prism device of FIG. 12A, 12B and 13.

FIG. 15 shows a photo mask for fabricating inhomogeneous liquid crystal polymer network for the prism device.

FIG. 21B is a beam steering application using the invention, with voltage on.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This invention provides electrically tunable polarization-independent micro lenses with the use of inhomogeneous polymer network of approximately 90° TN-LC, which operate at lower voltage. The inhomogeneous polymer network of approximately 90° TN-LC are positioned between transparent electrodes made of ITO (indium tin oxide) film on glass substrate layers, where the TN-LC molecules are wrapped by a polymer network and held in position between sandwiched glass or transparent plastic substrates. An example of a transparent plastic, suitable for this invention, is polyethylene terephthalate (PET).

Figure 1A:
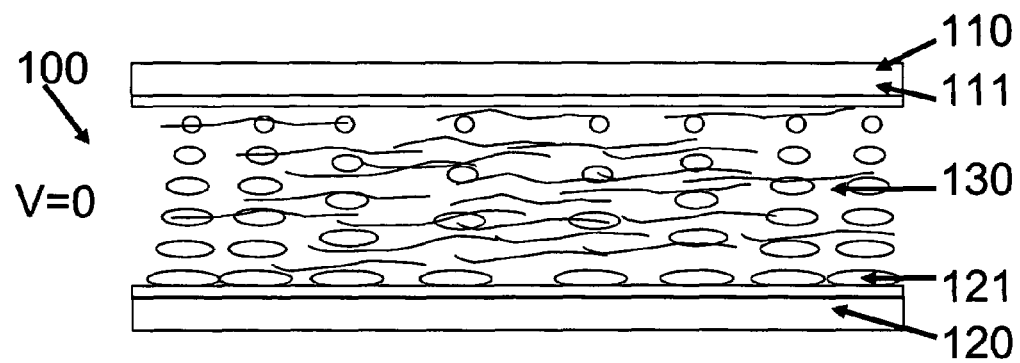
FIG. 1A shows a positive liquid crystal micro lens using the inhomogeneous 90° twisted nematic liquid crystal polymer network of the invention with zero voltage applied.
Figure 1B:
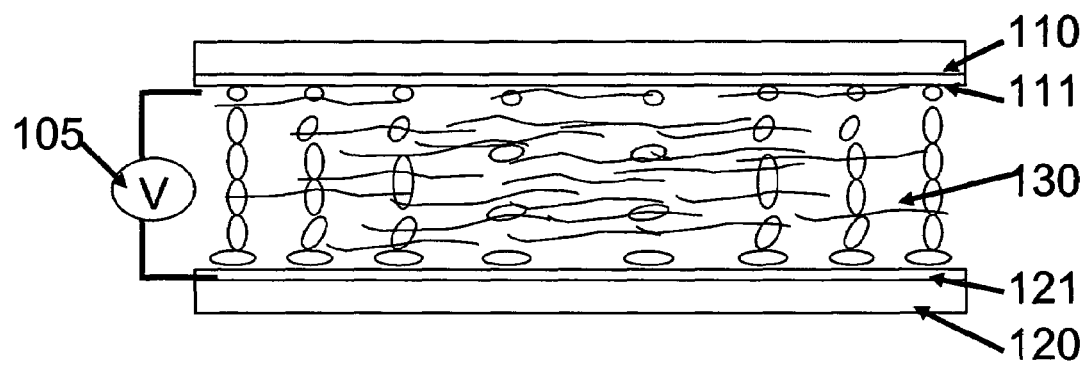
FIG. 1B shows a positive liquid crystal micro lens of FIG. 1A with voltage being applied.

FIG. 1A shows a side cross-sectional view of a positive liquid crystal lens 100 using the inhomogeneous 90° TN-LC polymer network of the invention at 0 volts. FIG. 1B shows the positive liquid crystal lens of FIG. 1A with voltage 105 being applied. Referring to FIGS. 1A-1B, for the positive lens 100, the polymer network 130 can be positioned between glass substrates 110, 120 each having inwardly facing indium tin oxide (ITO) surface layers 111, 121, with a voltage supply 105 supplying voltage to the ITO layers 111, 121.

Figure 4A:
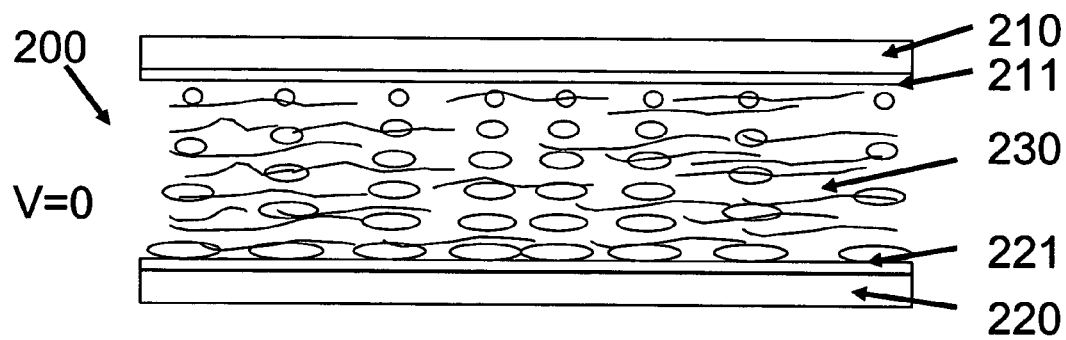
FIG. 4A shows a negative liquid crystal micro-lens using the inhomogeneous 90° twisted nematic liquid crystal polymer network of the invention with zero voltage applied.
Figure 4B:
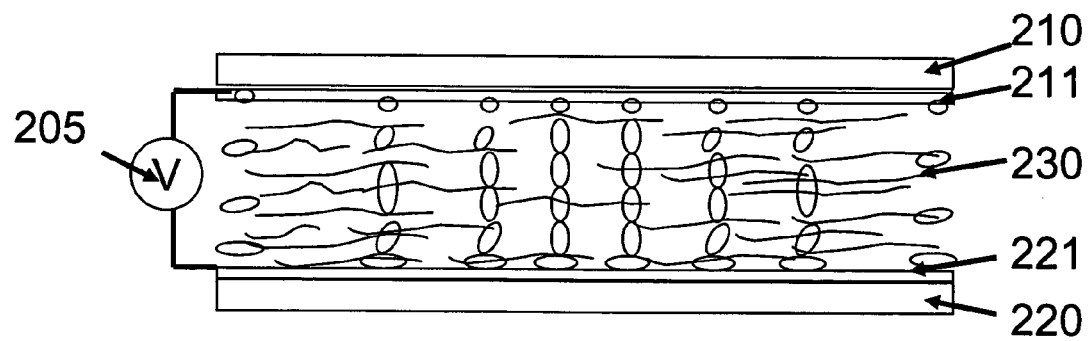
FIG. 4B shows the negative liquid crystal micro-lens of FIG. 4A with voltage being applied.

Referring to FIG. 1A and FIG. 4A, in the voltage OFF state, the device has uniform twisted structure and is transparent and no light scattering is observed. As the voltage is applied to the cell as shown in FIG. 1B and FIG. 4B, the LC directors inside the polymer network are reoriented under the effect of the electric field. In a TN-LC cell, there are two threshold voltages: Freedericksz threshold $V_f$ and optical threshold $V_{op}$ (Konfortia, et al. "Phase-only modulation with twisted nematic liquid-crystal spatial light modulators," *Optics Letters*, Vol. 13, No. 3, March 1998, pp. 251-253.). The Freedericksz threshold corresponds to the tilt of the molecular directors while the optical threshold corresponds to the break of the uniform twisted structure in the bulk of the TN cell. The refractive index is independent of the incident polarization until the applied voltage is beyond a value (or threshold voltage $V_{th}$). LC materials and the cell gap usually determine the threshold voltage $V_{th}$. For example, for pure LC E-7 in a 10 μm TN cell, the refractive index is polarization independent at $V>3 V_{rms}$. While for a TN-LC in polymer network, the threshold voltage $V_{th}$ additionally depends on the polymer concentration: the higher the polymer concentration, the higher the threshold voltage. As a result, the gradient refractive index profile is generated. To ensure the LC micro lens is polarization independent, a biased voltage at least equal to the highest threshold voltage (i.e. 5 Vrms) at the area (in the center for the positive lens and at the outer edge for the negative lens) with the highest polymer concentration should be applied to the cell. The highest applied voltage can be selected from values up to approximately 20 volts.

Figure 2:
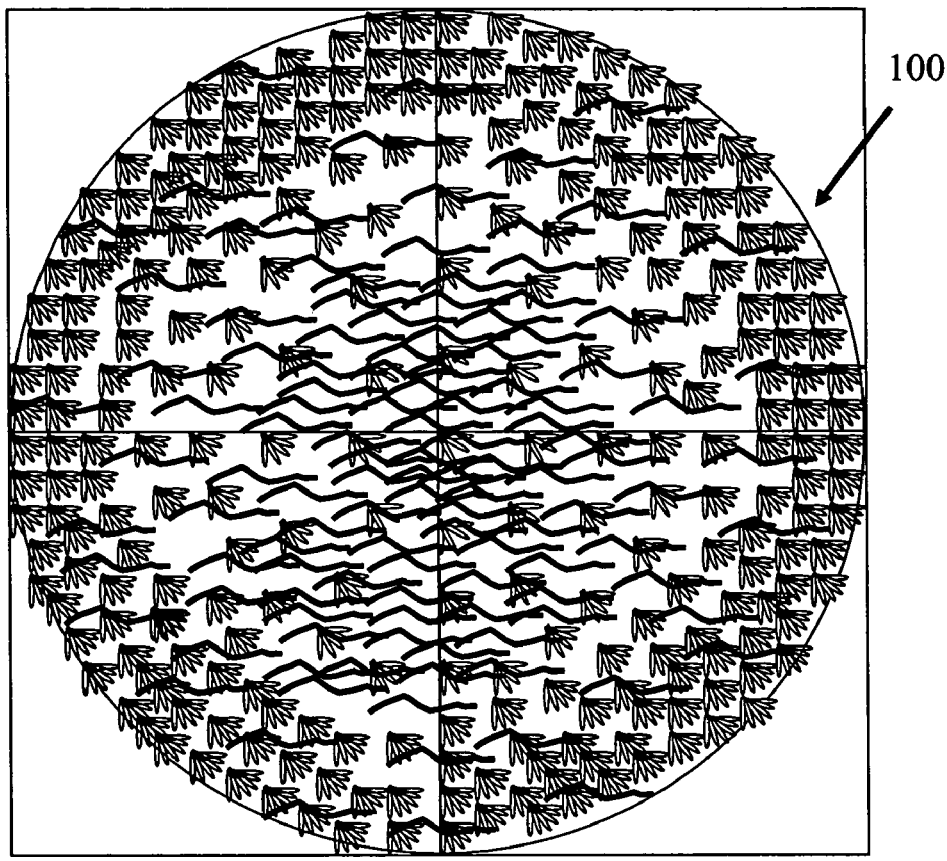
FIG. 2 shows a top view of a positive lens using the inhomogeneous 90° twisted nematic liquid crystal polymer network.

FIG. 2 is a top view of the positive lens 100 using an inhomogeneous polymer network. In the positive lens, the polymer concentration 40 in the liquid crystal 60 gradually increases from outer edges to center. FIG. 2 shows how the polymer concentration 40 increases radically from the outer side edges to the center.

Figure 3:
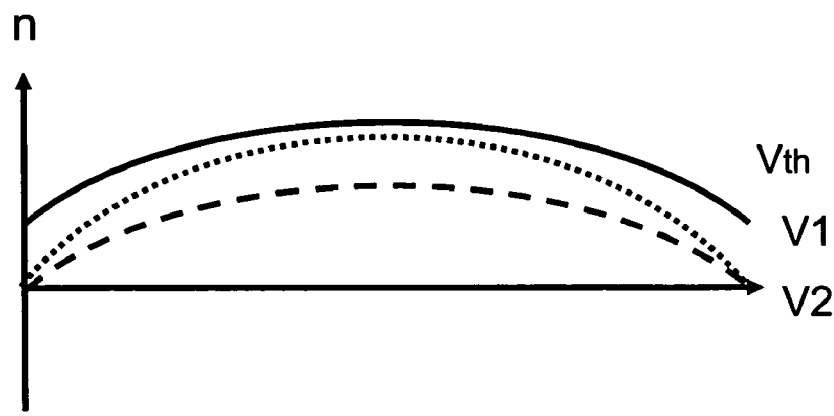
FIG. 3 shows a refractive index profile graph across a pixel of the lenses of FIG. 1B with different voltage applied.

FIG. 3 shows a refractive index profile graph across a pixel of the lenses of FIG. 1B with voltage applied at different levels. The area with a higher polymer concentration would exhibit a higher refractive index, as shown by V2 compared by V1 to Vth.

Referring to FIG. 3, the axis Y refers to the refractive index at different uniformly applied voltages of $V=V_{th}$, $V=V1$, $V=V2$, respectively with the X axis showing the corresponding refractive index across the different area with different polymer concentration. The refractive index in the center of the positive lens with higher polymer concentration is higher than the refractive index at the outer side edges of the lens with lower polymer network concentration.

FIG. 4A shows a side cross-sectional view of a negative liquid crystal micro lens using the inhomogeneous approximately 90° TN-LC polymer network of the invention without voltage. FIG. 4B shows the negative liquid crystal micro lens of FIG. 4A with voltage being applied. In the negative lens, the polymer concentration 40 gradually increases from center to outer edges.

Referring to FIGS. 4A-4B, for the negative lens 200, the polymer network 230 can be supported between glass substrates 210, 220 each having inwardly facing indium tin oxide (ITO) surface layers 211, 221, with a voltage supply 205 supplying voltage to the ITO layers 211, 221.

Figure 5:
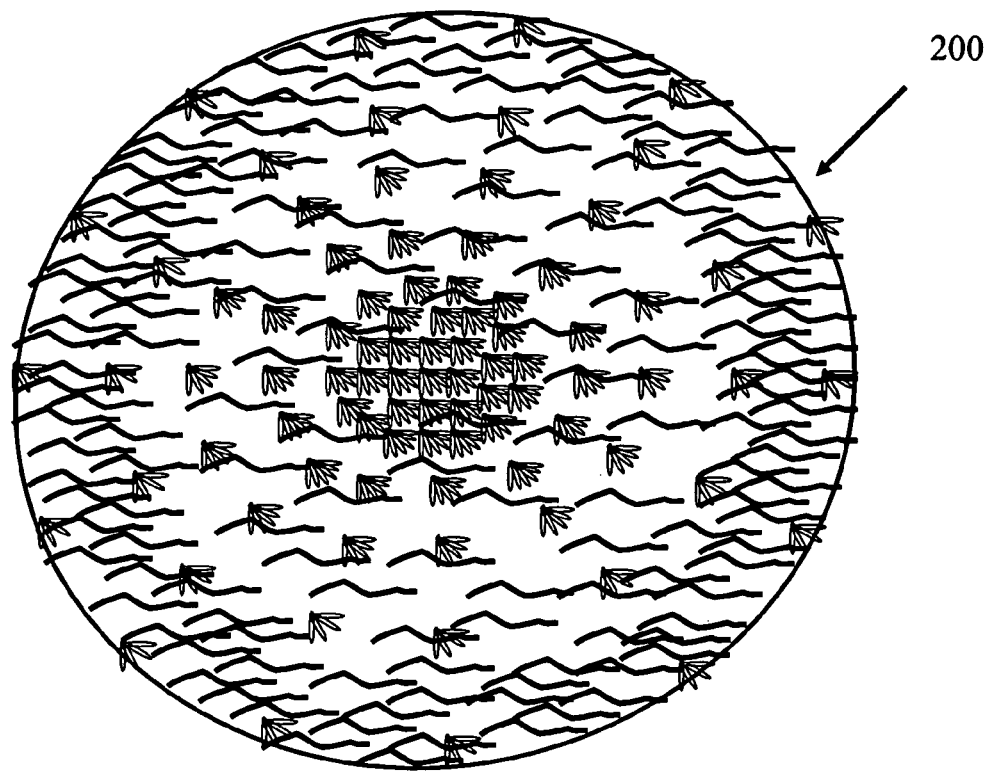
FIG. 5 shows a top view of a negative lens using the inhomogeneous 90° twisted nematic liquid crystal polymer network.

FIG. 5 shows a top view of the negative lens 200 using the inhomogeneous polymer network 230. The polymer concentration 40 increases radically from the center of the lens to the outer side edges.

Figure 6:
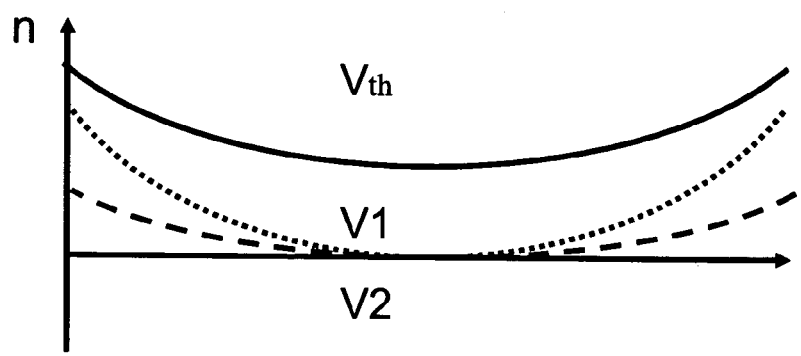
FIG. 6 shows a refractive index profile across a pixel of the micro-lens of FIG. 4B with different voltage applied.

FIG. 6 shows a refractive index profile across a pixel of the lenses of 4B with voltage, applied at different levels. In FIG. 6, when the applied voltage is low, the phase retardation between the center and the outer side edges increases with the increase of the applied voltage (V1>Vth). When the applied voltage is high enough, the refractive index gradient decreases with the growth of the applied voltage (V2>V1), because of the reorientation of the LC director along the electric field.

Referring to FIG. 6, the Y axis refers to the refractive index at different uniformly applied voltages of $V=V_{th}$, $V=V1$, $V=V2$, respectively with the X axis showing the corresponding refractive index across the different polymer concentration. For example, the refractive index in the center of the negative lens with lower polymer concentration is lower than the refractive index at the outer side edges of the negative lens with higher polymer concentration at the outer side edges of the negative lens.

Figure 7A:
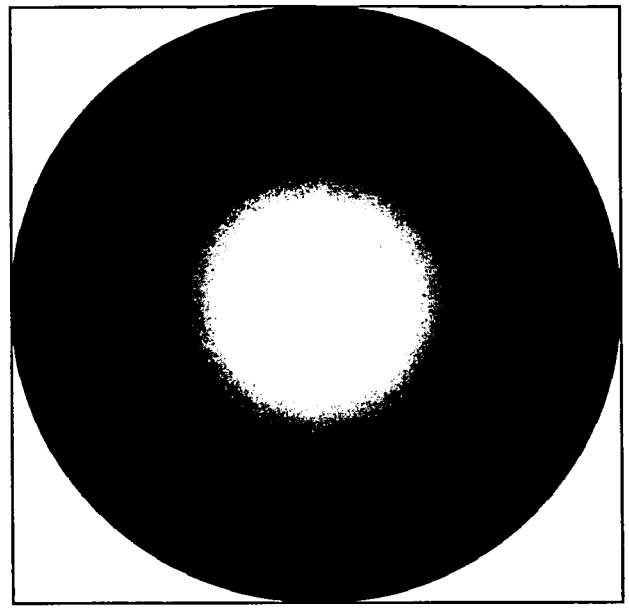
FIG. 7A shows a photo mask for fabricating inhomogeneous liquid crystal polymer network for positive lens of FIGS. 1A-1B.
Figure 7B:
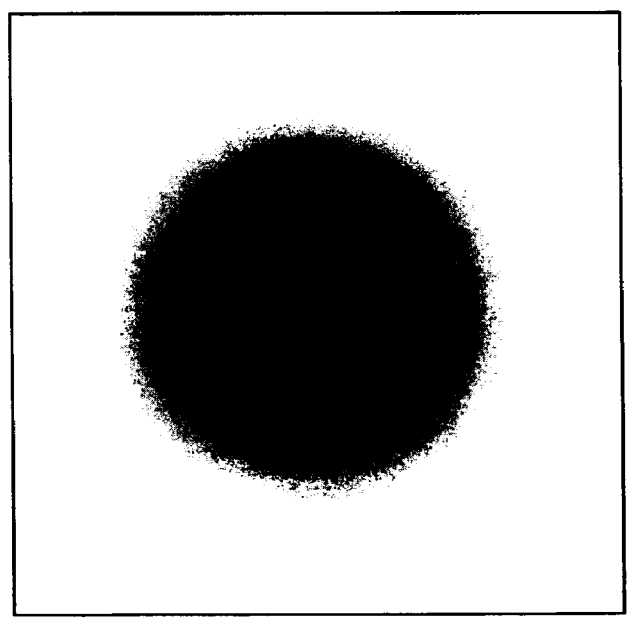
FIG. 7B shows a photo mask for fabricating inhomogeneous liquid crystal polymer network for negative lens of FIGS. 4A-4B.

These inhomogeneous approximately 90° TN-LC polymer network distributions shown in FIGS. 1A-1B and 4A-4B, can be easily fabricated by injecting the LC/monomer mixture to a cell with two alignment layers rubbed at orthogonal directions and then exposing UV light to the TN-LC/monomer mixture through both positive and negative patterned masks, as shown in FIGS. 7A-7B which show front views of masks 150, 250, respectively. In the brighter region, the higher UV exposure accelerates the polymerization process resulting in a higher polymer concentration. In the weaker UV exposure regions, the polymer concentration is lower.

The novel photo mask 150, 250 shown in FIGS. 7A-7B can be circular shape and can be formed from a glass type material coated by chrome with circular continuously variable transmitivity from center to the outer edge such as those found in a circular continuously variable optical density filter, and the like. For the positive lens photo mask 150 of FIG. 7A, the transparence can decrease linearly from the center to the outer side edges. For the negative lens photo mask 250 of FIG. 7B, transparence can increase linearly from the center to the outer edges.

Figure 8:
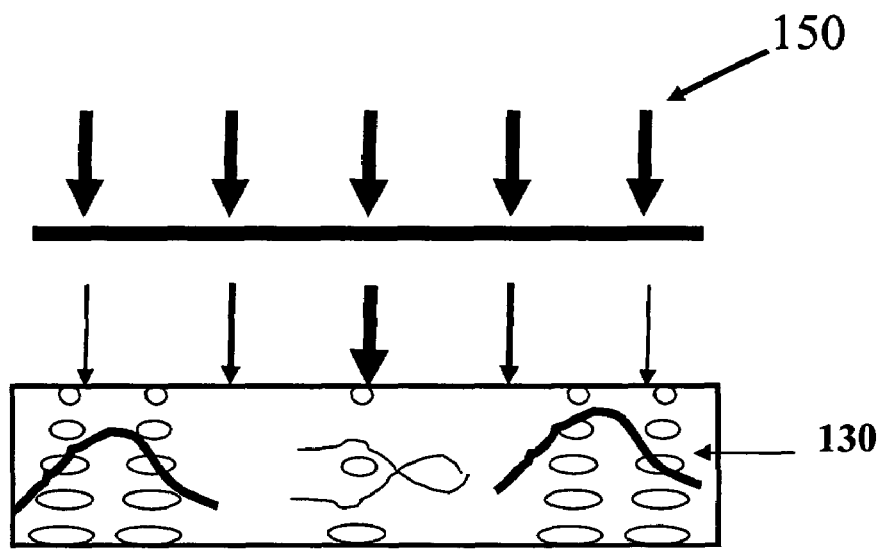
FIG. 8A shows a side view of the positive photo mask of FIG. 7A with UV light and resultant polymer network.
FIG. 8B shows a side view of the negative photo mask of FIG. 8A with UV light and resultant polymer network.
Figure 8:
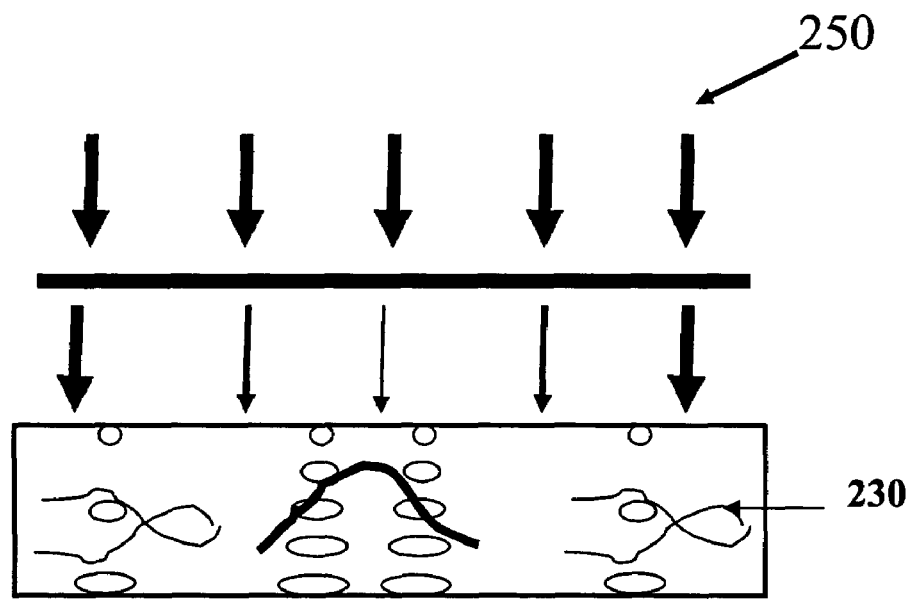

FIGS. 8A and 8B show side views of the novel positive masks 150 and the negative mask-250 with ultraviolet (UV) light passing through the masks 150, 250 causing originally uniform TN-LC/monomer mixture to turn into inhomogeneous polymer network 130, 230 respectively.

Figure 9:
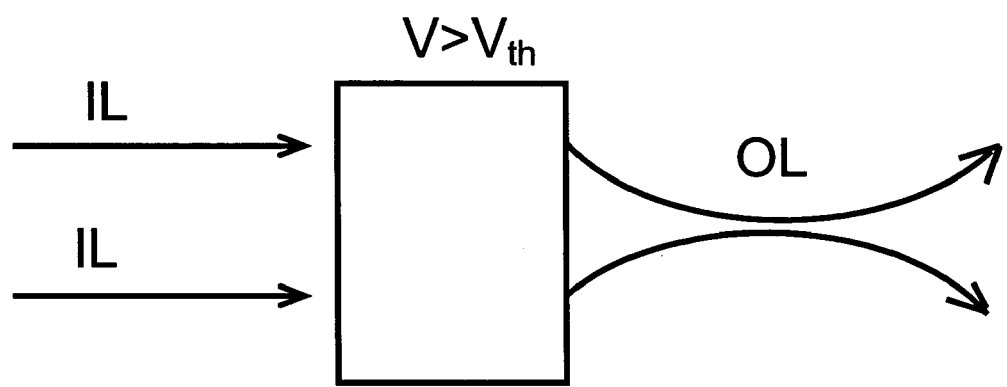
FIG. 9 shows an exemplary embodiment application of using the positive lens or the negative lens of the preceding figures with voltage above $V_{th}$.

FIG. 9 shows an exemplary embodiment application of using the positive lens 100 or the negative lens 200 of the FIGS. 2 and 5, respectively, with voltage greater than $V_{th}$. Referring to FIG. 9, IL refers to an input light source such as an input ultra violet radiation, and OL refers to output light.

Usually, ~10% of the LC birefringence is available for the polarization-independent phase modulation (Huang et al. Simulations of liquid-crystal Fabry-Perot etalons by an improved 4×4 matrix method, *Journal of Applied Physics*, Vol. 93, No. 5 Mar. 2003, pp 2490-5.). For example, for TN-LC E7, ~0.02 refractive index variation can be used for polarization-independent phase grading. The focal length of the LC micro lens can be evaluated using the following equation 1.

$$1.\ f = \frac{\pi D^2}{4\delta\Phi}$$

Where D is the diameter of the lens and $\delta\Phi = 2\pi d\delta n$ is the phase variation in space, $\delta n$ is the refractive index gradient in space. The focal length of the LC lens depends on the birefringence of the used LC materials, cell gap and the diameter of the LC lens: the larger the birefringence and cell gap, the shorter the focal length, and the larger the size of the LC lens, the longer the focus. FIG. 10 shows the minimal focal length that LC lenses can achieve using various birefringence LC materials, cell gaps and diameters.

Numerical aperture is another important parameter for the application of LC lens in microoptics. It determines the light gathering power and resolution of the device. It is defined as equation 2.

$$NA = n_{medium} \sin \theta \qquad 2.$$

$\theta$ is one half of the angular aperture of the lens and sin $$\theta = \frac{D}{2f} = \frac{4d\delta n}{\phi}.$$

In air, the numerical aperture can be written as equation 3.

$$3.\ NA = \frac{4d\delta n}{D}$$

Figure 10A:
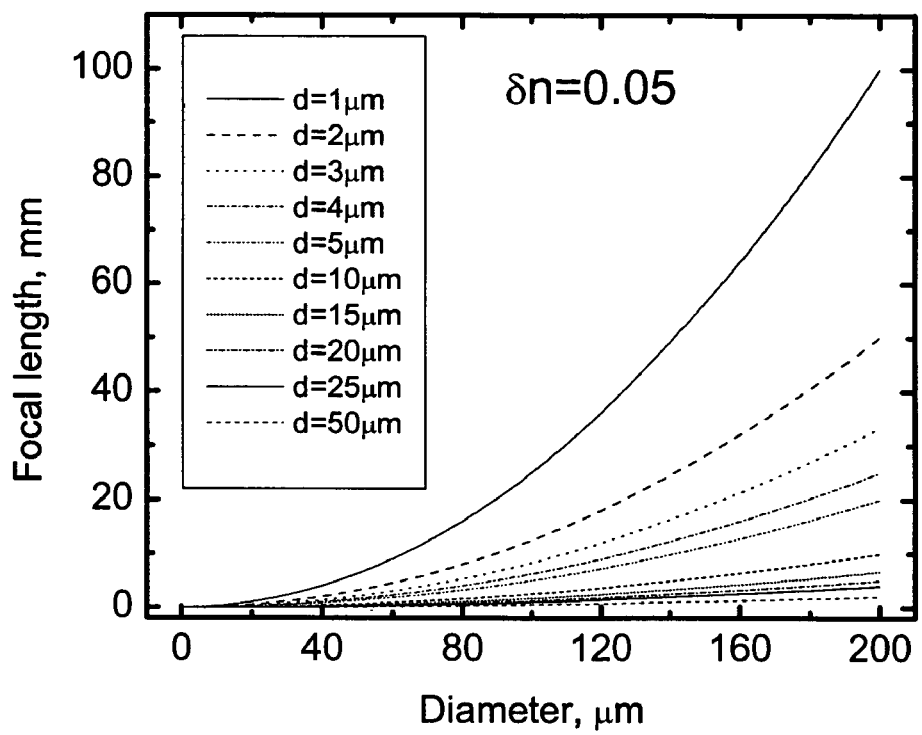
FIG. 10A shows the focal length of the liquid crystal lens using the liquid crystal with effective birefringence $\delta n=0.05$ available for polarization independent phase modulation, and various cell gaps and sizes in diameter.
Figure 10B:
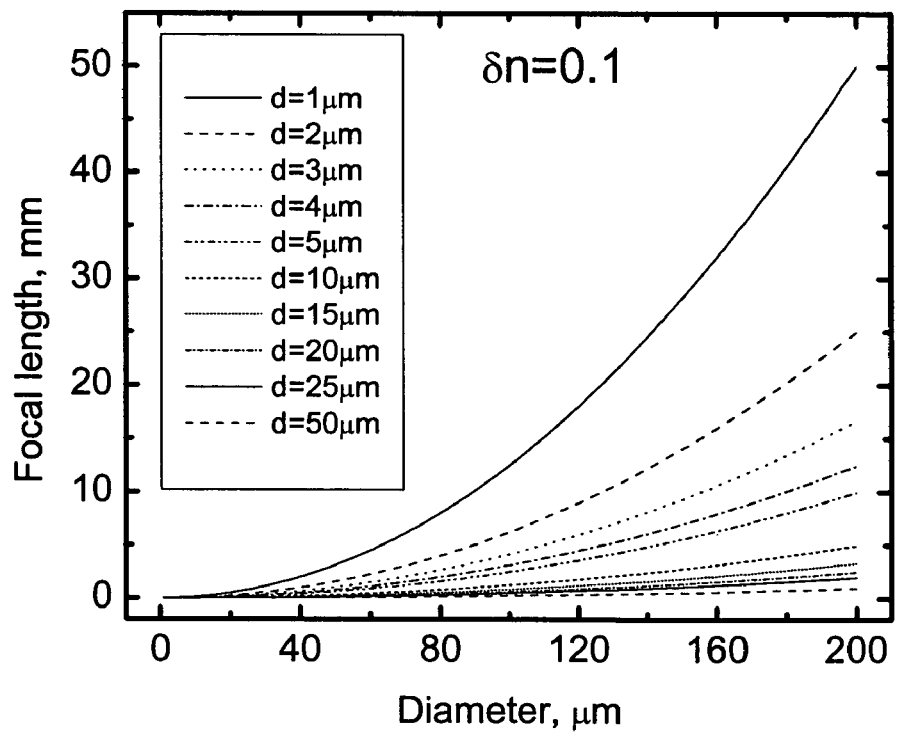
FIG. 10B shows the focal length of the liquid crystal lens using the liquid crystal with effective birefringence $\delta n=0.1$ available for polarization independent phase modulation, and various cell gaps and sizes in diameter.

The larger the cell gap and refractive index grading in space, the larger the numerical aperture (NA), and the larger the lens size, the smaller the numerical aperture (NA), as shown in FIGS. 10A and 10B.

Figure 11A:
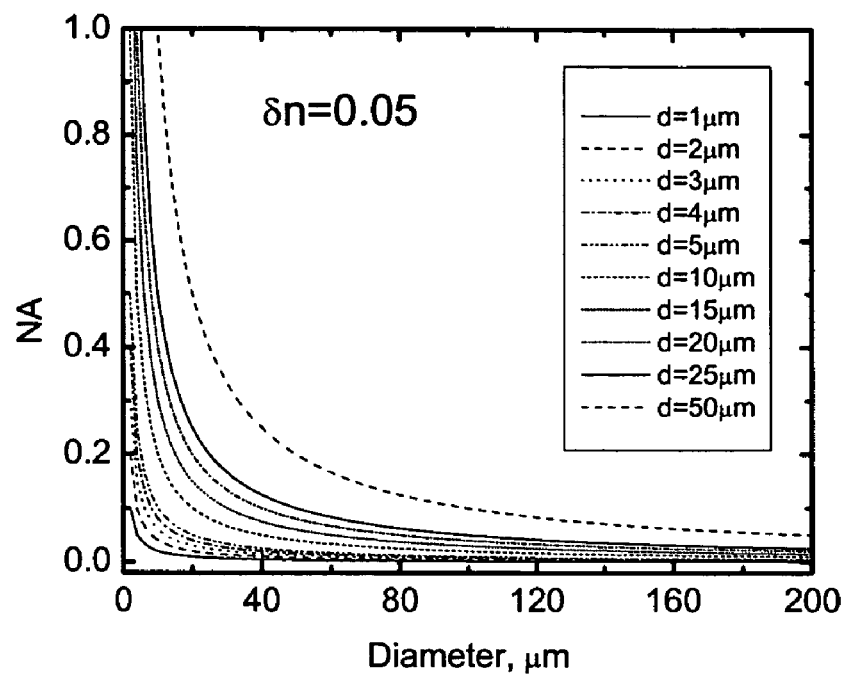
FIG. 11A shows numerical aperture of the liquid crystal lens using the liquid crystal with effective birefringence $\delta n=0.05$ available for polarization independent phase modulation, and various cell gaps and sizes in diameter.
Figure 11B:
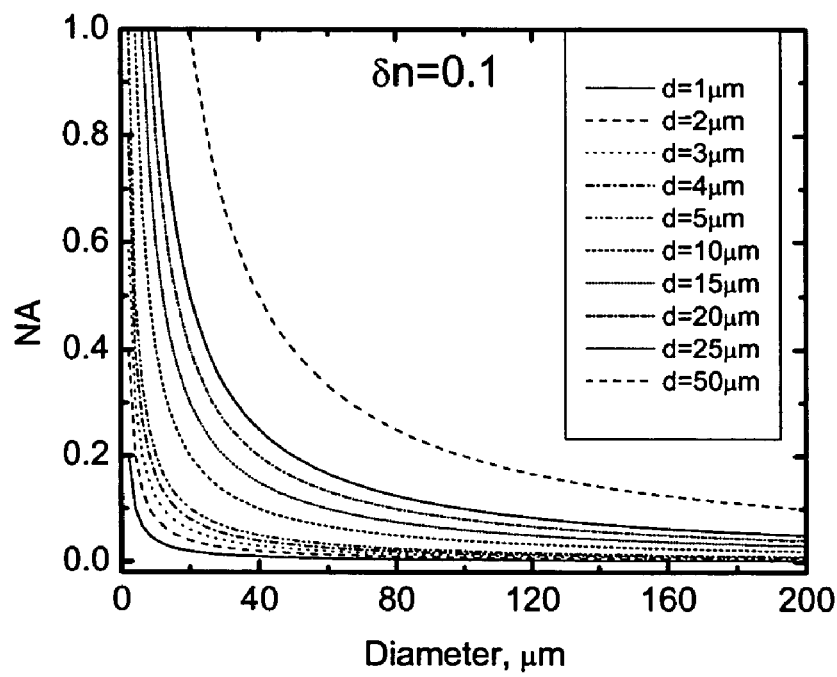
FIG. 11B shows numerical aperture of the liquid crystal lens using the liquid crystal with effective birefringence $\delta n=0.1$ available for polarization independent phase modulation, and various cell gaps and sizes in diameter.

Referring to FIGS. 11A and 11B, the LC device with higher birefringence LC materials, thicker cell gap and smaller size in diameter can obtain higher numerical aperture (NA) and shorter focal length. By using various cell gap, different birefringence LC materials and different size of the photo mask in diameter, LC lenses with various tunable focus and numerical apertures (NA) can be fabricated to satisfy various demands. For example, if we use a LC material with Δn=0.5, 10 μm cell gap and 63 μm of photo mask in diameter, we can get a tunable lens with 1 mm minimal focus.

FIG. 12A shows a side view of a prism device 300 using inhomogeneous polymer network of 90° TN-LC at zero voltage. Polymer network 330 is supported between glass substrates 310 and 320, coated with ITO layers 311 and 321 respectively. FIG. 12B shows the prism device of FIG. 12A with voltage 305 being applied to the ITO layers 311 and 321; the voltage is greater than $V_{th}$(V=V1, V=V2, respectively). FIG. 13 shows a voltage plot of the prism device of FIG. 12B.

FIG. 14 shows a photo mask 325 for fabricating inhomogeneous approximately 90° TN-LC polymer network 330 for the prism device as shown in FIGS. 12A, 12B and 13. The inhomogeneous polymer network 330 can be twisted at an angle of approximately 88° to approximately 92°, preferably 90° and made in the same way as the positive and negative lens described above in reference to FIGS. 7A and 7B; FIG. 7A is a positive lens photomask and FIG. 7B is a negative lens photomask.

Example 1

Preparation of Inhomogeneous 90° TN-LC Polymer Network

Liquid crystal material (E48 LC from Merck Corp.) is mixed with diacrylate monomer, bis[6-(acryloyloxy)hexyloxy]-1,1'biphenylene (BAB6) at 97:3 ratio (approximately 97% liquid crystal to approximately 3% monomer). Then a photomask 350 with transmittance increasing linearly from one side to the other side, as shown in FIG. 15, was used for UV exposure. The exposure time was approximately 30 minutes at approximately 37-mW/cm$^2$. The TN-LC cell gap was ~10 μm sandwiched between two indium tin oxide (ITO) coated glass substrates.

Figure 16A:
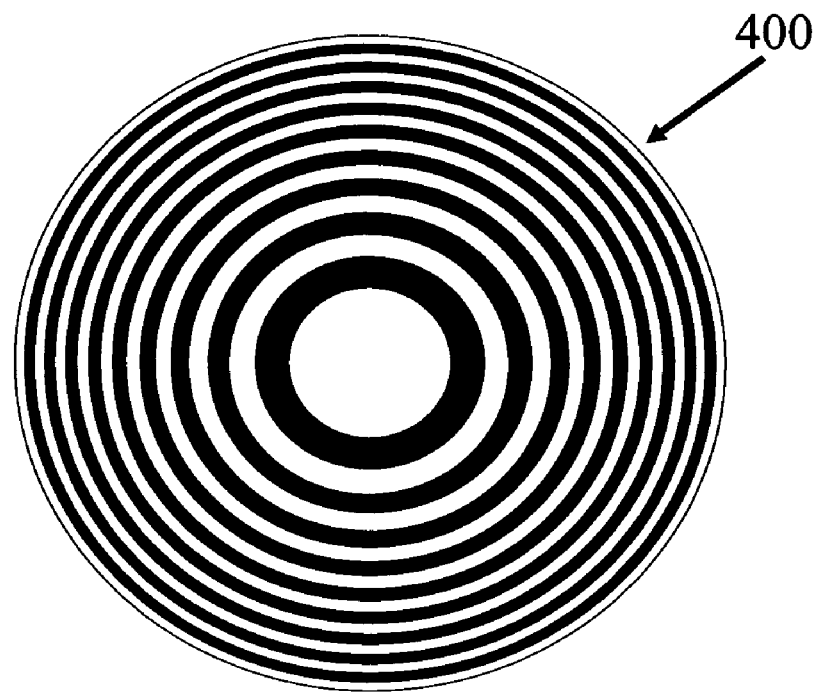
FIG. 16 shows the polarization-independent spatial phase profile of the prism fabricated by the photo mask of FIG. 15 when the applied voltage is above 4.5 Vrms.
Figure 16B:
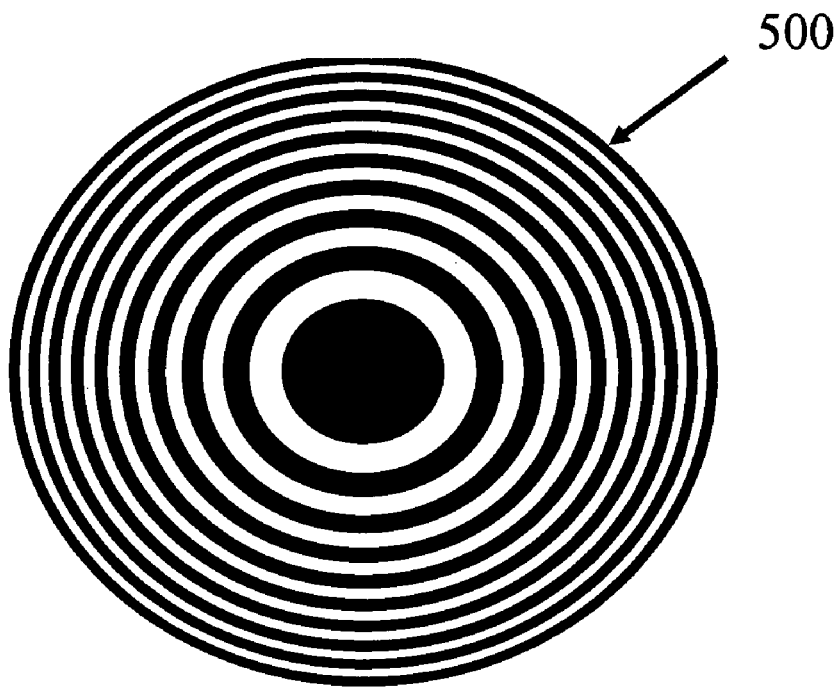

The higher UV exposure induced a faster phase separation leading to higher polymer network concentration. Conversely, the area illuminated by lower UV intensity produces a lower polymer network concentration. The highest polarization-independent threshold voltage $V_{th}$ at the area with bright exposure is about 4.5 Vrms. FIG. 16 shows the spatial phase profile of the prism when the applied voltage is above 4.5 Vrms. Due to the linearly spatial gradient of the polymer network concentration, a linearly spatial gradient of refractive index is formed when the voltage is applied to the device. With the increase of the applied voltage, the phase at any position decreases since the LC director is reoriented along the electric field. As a result, the phase gradient is gradually flattened when the applied voltage is above 5 Vrms.

The invention can also be used to fabricate Fresnel lens using a circular patterned mask. The process is quite simple and the associated cost is low.

Figure 17A:
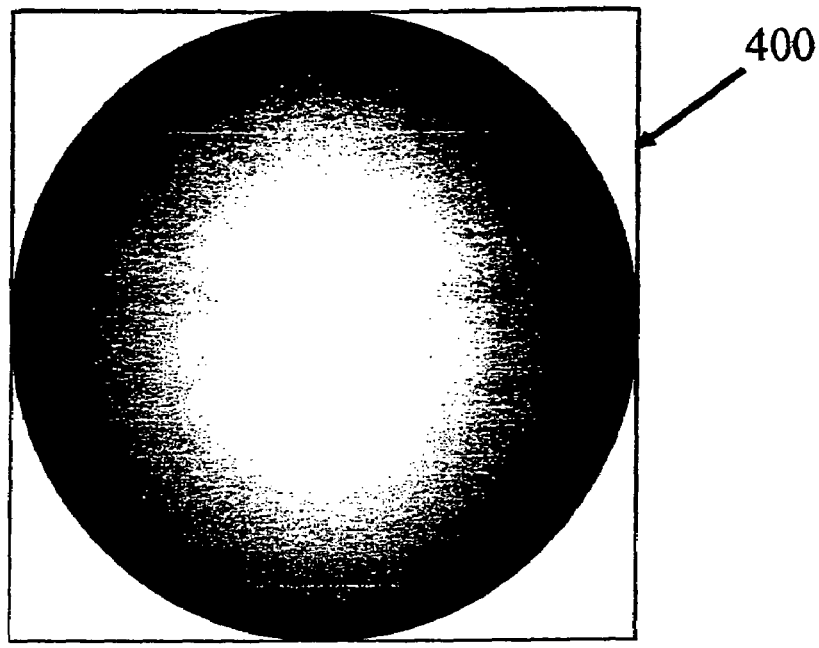
FIG. 17A shows a front surface of a positive Fresnel lens mask according to the invention.

FIG. 17A shows a front surface of a positive Fresnel lens mask 400 according to the invention. For the positive Fresnel lens mask 400, concentric rings on the glass substrate can have a uniform opaqueness, where opaqueness zones between the rings increasing linearly from the center to the outer side edges.

Figure 17B:
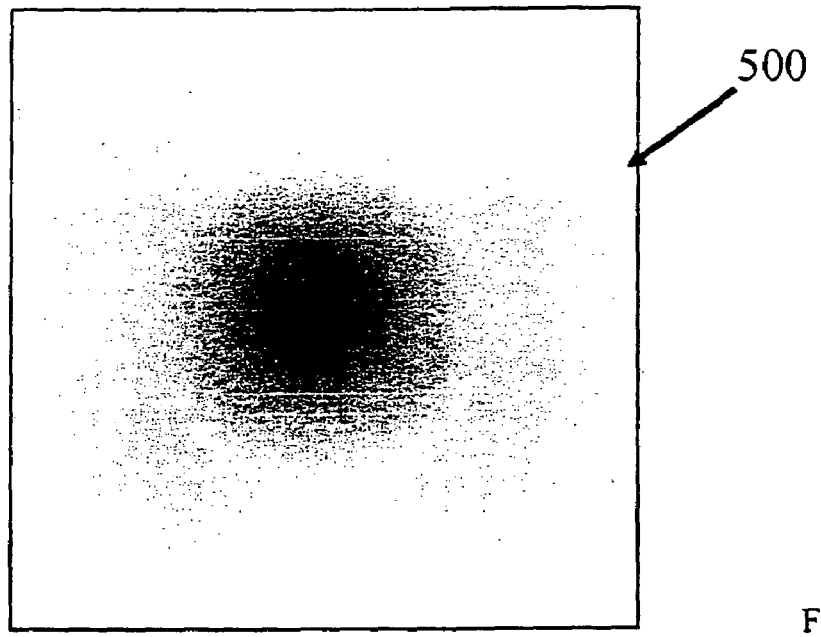
FIG. 17B shows a front surface of a negative Fresnel lens mask according to the invention.

FIG. 17B shows a front surface of a negative Fresnel mask 500 according to the invention. For the negative Fresnel lens mask 500, the concentric rings can have a uniform opaqueness, and the opaqueness zones between the rings can decrease linearly from the center to the outer side edges.

The inhomogeneous polymer network of the Fresnel lens can be formed using these respective masks 400, 500 following similar layout as that previously described above for forming other previously described lenses and prisms.

Figure 18:
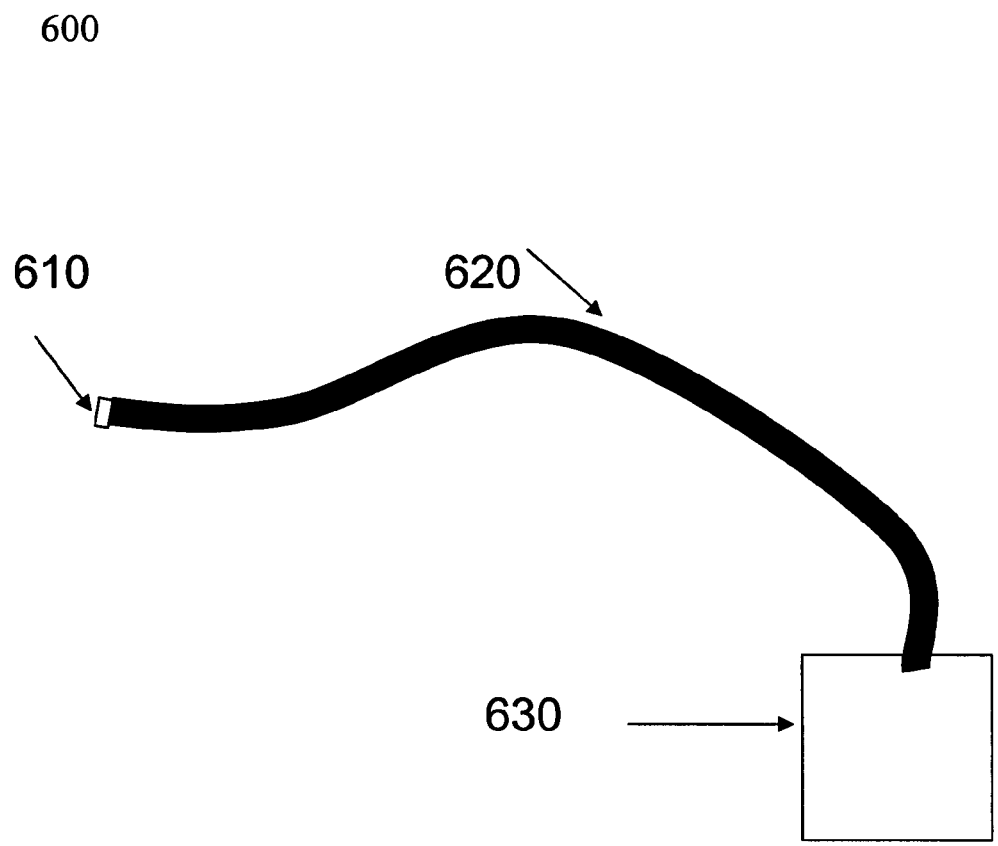
FIG. 18 shows a fiber related application such as optical communication, optical biomedicine etc. using this invention.

FIG. 18 shows a perspective view of a fiber related application 600 using the invention. The invention can be used in optical communication by attaching the LC lens 610 on a fiber 620. The invention can provide a convenient method for doctor to diagnose the disease inside the human body using the combination of the tunable lens 610 of the present invention and an optical fiber 620 connected to diagnostic equipment 630. The invention can also have other applications in fiber related micro optical field.

Figure 19:
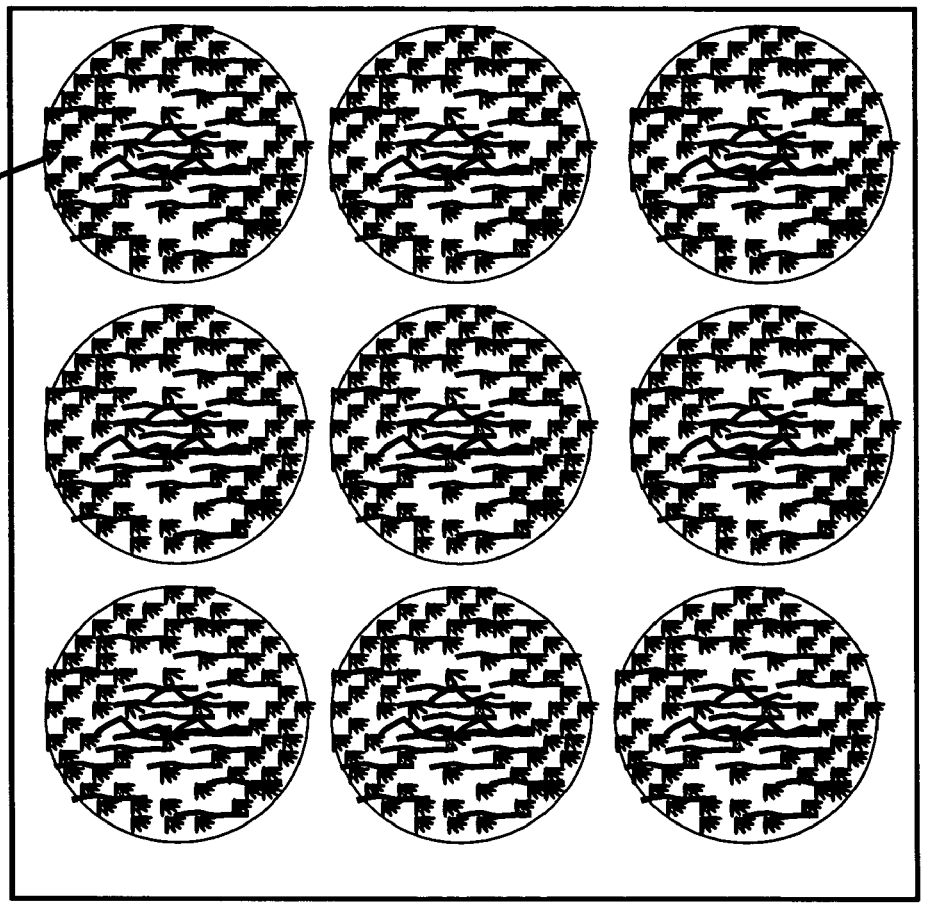
FIG. 19 shows a top view of a positive lens array using the novel inhomogeneous 90°-twisted nematic liquid crystal polymer network

By spatially repeating these prism or lens processes, an array of switchable prism or lens can be achieved by splitting middle pixels in the lens. FIG. 19 shows a top view of a positive lens array 700 using the novel inhomogeneous liquid crystal polymer network each arranged on parallel rows of circular type lenses 730. The array 700 can use the individual positive lenses depicted previously in reference to FIGS. 1A, 1B, and 7. This new optical phased array can also be used for adaptive optics and broadband beam steering.

Figure 20:
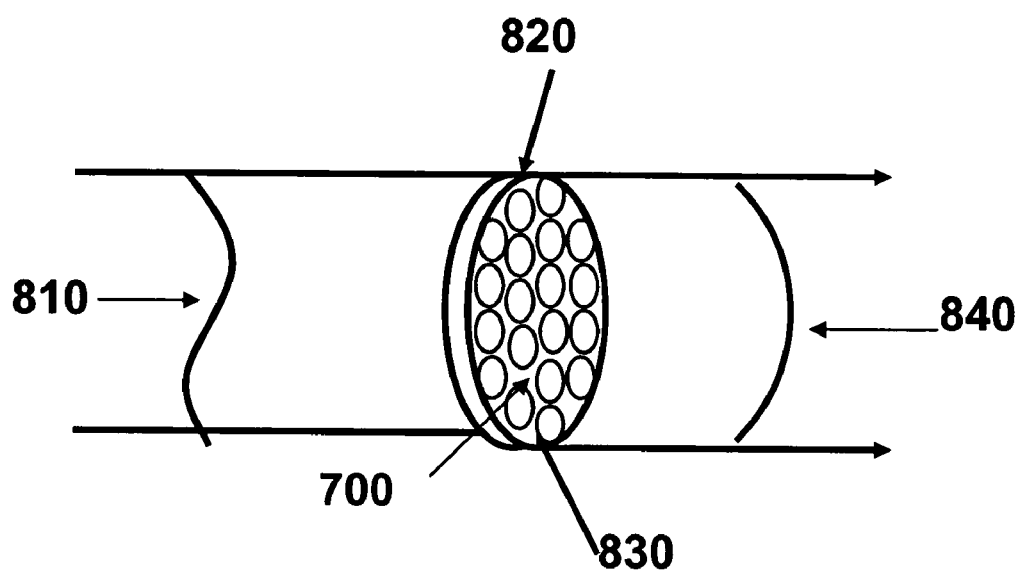
FIG. 20 shows an adaptive optics application using this invention.

FIG. 20 shows an adaptive optics application 800 using the invention. Here, the micro lens array, shown in FIG. 19, is used as a deformable mirror. The perturbed incoming light 810 is corrected after going through a micro lens array 700 connected to driver electronics 820 and an independently addressable liquid crystal (LC) phase shifter 830 that control the voltage on every pixel to produce a corrected wave front 840.

Figure 21A:
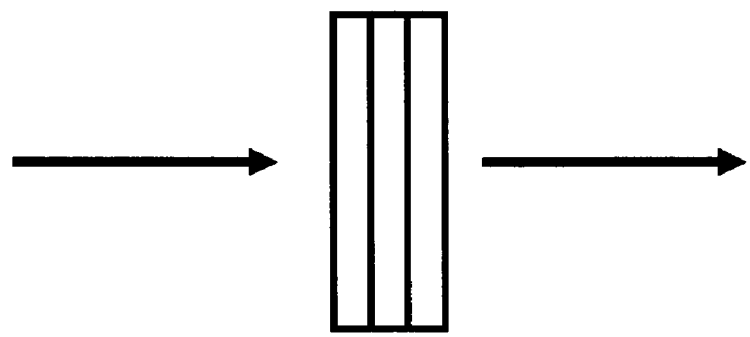
FIG. 21A is a beam steering application using the invention, with voltage off.
Figure 21B:
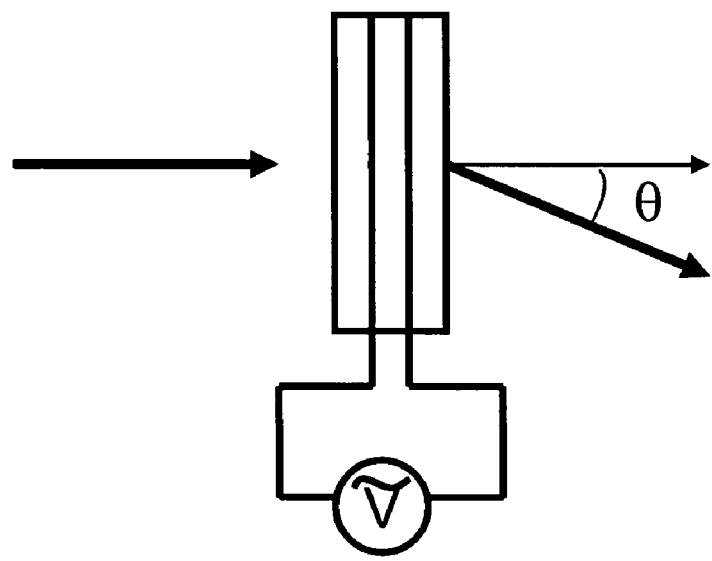

FIGS. 21A and 21B show a beam steering application 900 using the invention. In the voltage-off state as shown in FIG. 21A, incoming light (IL) 910 passes through the prism and remains unchanged passing through the prism 900 as output light 920 in a straight direction. In the voltage-on state as shown in FIG. 21B, the incoming light (IL) beam 930 is deflected at an angle to produce output light 940. The deflection angle can be controlled by the applied electric field.

The invention has several applications in addition to those described above. For example, the invention can be used with projection display, other optometry application, and the like. In order to achieve the tunable focusing effect, the photo mask should have a circular intensity variation, rather than linear grating as we used for the experiment.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of fabricating an inhomogeneous layer of approximately 90° TN-LC polymer network, wherein one of a negative and a positive lens is formed by using a photo mask with transparency that increases linearly from the center to the outer side edges of the negative lens and increases linearly from the outer side edges to the center of the positive lens.

* * * * *